US010795561B2

(12) United States Patent
Lin

(10) Patent No.: US 10,795,561 B2
(45) Date of Patent: Oct. 6, 2020

(54) COMPUTER SYSTEM AND INTERFACE OPERATION METHOD THEREOF

(71) Applicant: PEGATRON CORPORATION, Taipei (TW)

(72) Inventor: Tzu-Pin Lin, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/405,842

(22) Filed: May 7, 2019

(65) Prior Publication Data

US 2019/0346998 A1  Nov. 14, 2019

(30) Foreign Application Priority Data

May 9, 2018 (TW) .............................. 107115779 A

(51) Int. Cl.
   *G06F 3/0484* (2013.01)
   *G06F 3/0482* (2013.01)
   *G06F 3/0489* (2013.01)
   *G06F 3/0354* (2013.01)

(52) U.S. Cl.
   CPC ........ *G06F 3/04847* (2013.01); *G06F 3/0482* (2013.01); *G06F 3/0489* (2013.01); *G06F 3/03543* (2013.01); *G06F 3/03547* (2013.01); *G06F 3/03549* (2013.01); *G06F 2203/04803* (2013.01)

(58) Field of Classification Search
   CPC .................................................. G06F 3/04847
   USPC ........................................................ 715/771
   See application file for complete search history.

(56) References Cited

U.S. PATENT DOCUMENTS

| 7,665,039 | B2  |    | 2/2010 | Chaudhri et al. |              |
|-----------|-----|----|--------|-----------------|--------------|
| 8,600,446 | B2  |    | 12/2013| Chiang et al.   |              |
| 8,683,490 | B2  | *  | 3/2014 | Endrikhovski    | G06F 3/04847 |
|           |     |    |        |                 | 715/771      |
| 9,001,149 | B2  | *  | 4/2015 | Sirpal          | G06F 1/1616  |
|           |     |    |        |                 | 345/619      |
| 2005/0216865 | A1 | * | 9/2005 | Rollin         | G06F 3/0482  |
|           |     |    |        |                 | 715/839      |
| 2008/0120565 | A1 | * | 5/2008 | Stiso          | G06F 3/04847 |
|           |     |    |        |                 | 715/771      |

(Continued)

FOREIGN PATENT DOCUMENTS

| CN | 102880399 | 1/2013 |
| CN | 106537319 | 3/2017 |

(Continued)

OTHER PUBLICATIONS

"Search Report of Europe Counterpart Application", dated Aug. 26, 2019, p. 1-p. 8.

*Primary Examiner* — William D Titcomb
(74) *Attorney, Agent, or Firm* — J.C. Patents

(57) ABSTRACT

A computer system and an interface operational method are provided. The interface operational method includes: receiving an input; determining whether the input conforms to a first operation, a second operation or not; and switching the current functional interface to another functional interface of a plurality of functional interfaces according to an arrangement order when the input conforms to the first operation, or selecting one message area of a plurality of message areas of the current functional interface when the input conforms to the second operation.

14 Claims, 9 Drawing Sheets

(56) References Cited

U.S. PATENT DOCUMENTS

| | | | |
|---|---|---|---|
| 2013/0145297 A1* | 6/2013 | Ricci | G07C 5/08 |
| | | | 715/765 |
| 2013/0293452 A1* | 11/2013 | Ricci | G02B 27/01 |
| | | | 345/156 |
| 2016/0011751 A1* | 1/2016 | Moses | G06F 3/0482 |
| | | | 715/769 |
| 2016/0188663 A1* | 6/2016 | Tsumura | G06F 16/2462 |
| | | | 715/771 |
| 2017/0052634 A1* | 2/2017 | Reeves | G06F 3/0412 |
| 2017/0083197 A1 | 3/2017 | Lee et al. | |
| 2018/0121082 A1* | 5/2018 | Zhu | G06F 3/04886 |

FOREIGN PATENT DOCUMENTS

| | | |
|---|---|---|
| EP | 3316112 | 5/2018 |
| JP | 2007257650 | 10/2007 |

\* cited by examiner

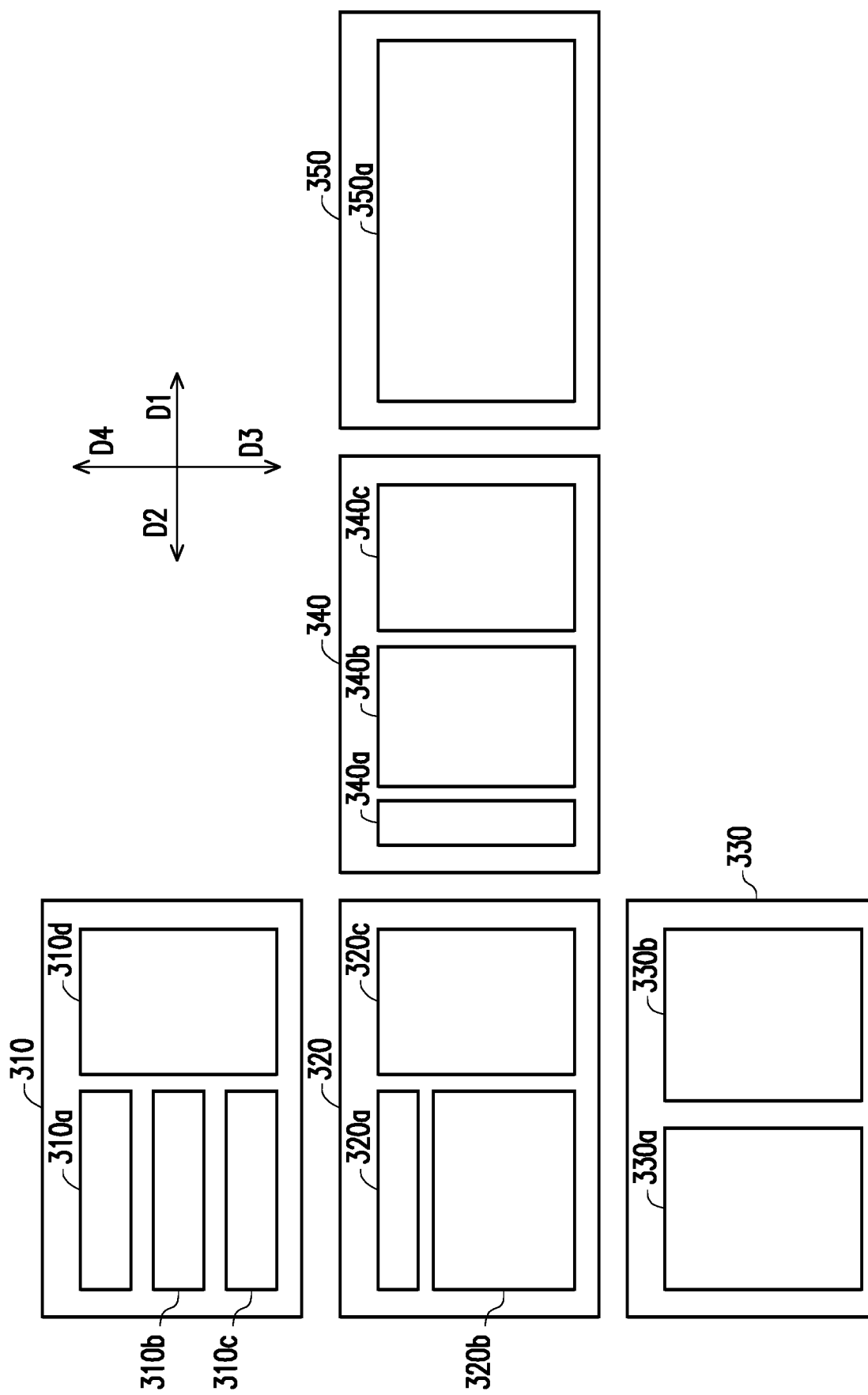

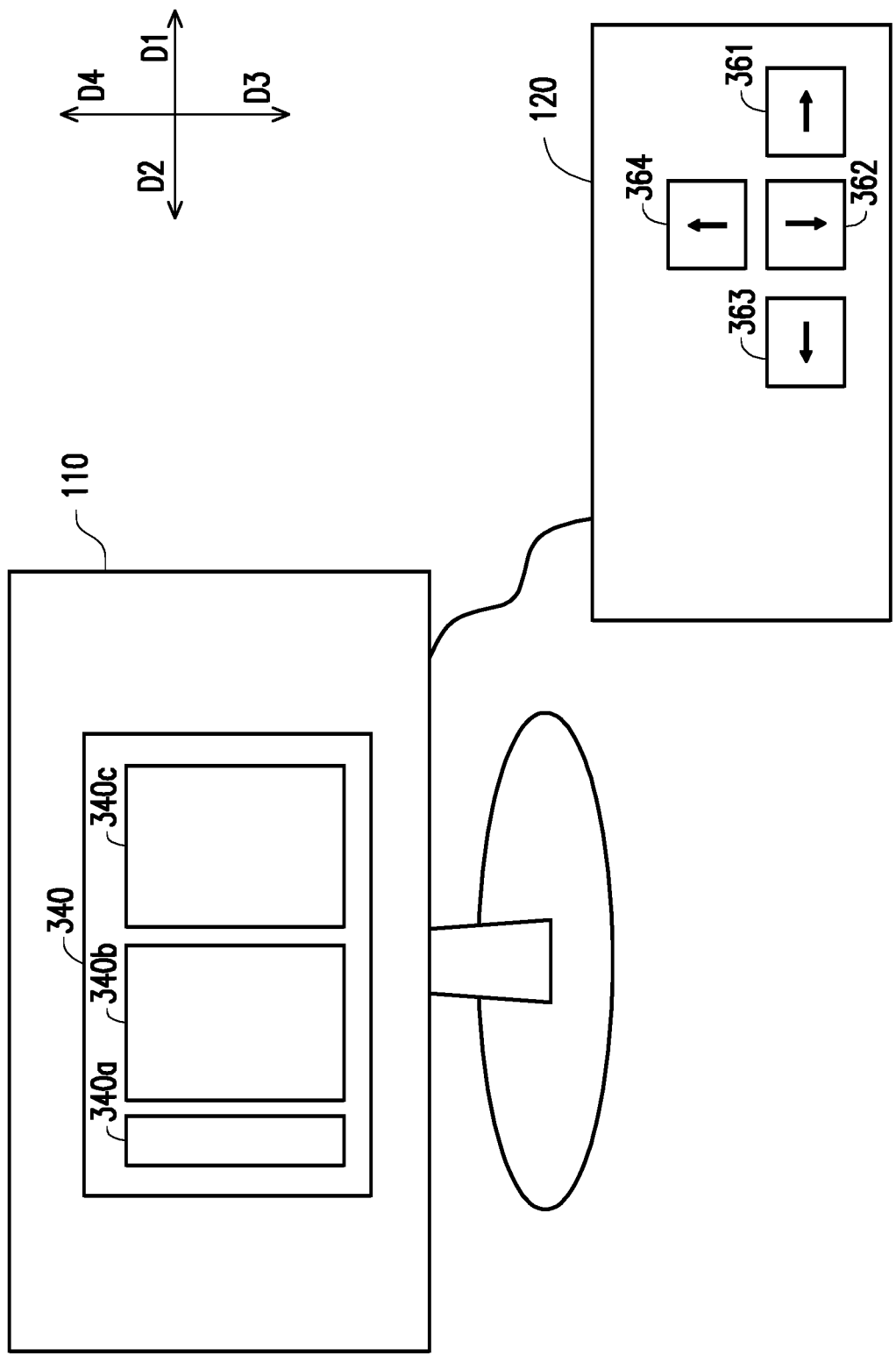

COMPUTER SYSTEM AND INTERFACE OPERATION METHOD THEREOF

CROSS-REFERENCE TO RELATED APPLICATION

This application claims the priority benefit of Taiwan application serial no. 107115779, filed on May 9, 2018. The entirety of the above-mentioned patent application is hereby incorporated by reference herein and made a part of this specification.

BACKGROUND

1. Technology Field

The present invention relates to a computer system and an operation method thereof, in particular, to a computer system performing fast and intuitive operation on a plurality of functional interfaces and an operation method thereof.

2. Description of Related Art

In an existing testing device, manufacturing device and monitoring device, mostly a display space of a display device is divided into a plurality of functional interfaces. A message area of the functional interface also occupies the display space of the functional interface. All the functional interfaces and the message areas of all the functional interfaces may be clearly displayed on a display device with a screen large enough or good resolution. Otherwise, all the functional interfaces and the message areas of all the functional interfaces are not likely to be clearly displayed on a display device with a small screen or low resolution.

In addition, in the existing testing device, manufacturing device and monitoring device, mostly an operation is performed through lots of operation keys and/or the plurality of functional interfaces displayed on a screen are operated through a cursor. Thus, an operator cannot quickly and intuitively operate the plurality of functional interfaces.

SUMMARY

The present invention provides a computer system and an operation method thereof, which may be used for fast and intuitively operating a plurality of functional interfaces.

An interface operation method of the present invention is used for a computer system. The computer system comprises an input device and a display device, the computer system provides the plurality of functional interfaces, the display device is used for displaying a current functional interface of the plurality of functional interfaces, and the plurality of functional interfaces has an arrangement order and each functional interface comprises a plurality of message areas. The interface operation method comprises: providing the plurality of functional interfaces; receiving an input through the input device; determining whether the input conforms to a first operation or a second operation; and switching the current functional interface to another functional interface of the plurality of functional interfaces according to the arrangement order when the input conforms to the first operation, or selecting one of the message areas of the current functional interface when the input conforms to the second operation.

A computer system of the present invention is used for providing a plurality of functional interfaces, the plurality of functional interfaces has an arrangement order and each functional interface comprises a plurality of message areas, and the computer system comprises a display device, an input device and a processor. The display device is used for displaying a current functional interface of the plurality of functional interfaces. The input device is used for receiving an input. The processor is used for determining whether the input conforms to a first operation or a second operation. The processor switches the current functional interface to another functional interface of the functional interfaces according to the arrangement order when the input conforms to the first operation, or selects one of the message areas of the current functional interface when the input conforms to the second operation.

Based on the above, according to the present invention, by determining whether the input conforms to the first operation or the second operation, the current functional interface is switched to another functional interface of the plurality of functional interfaces according to the arrangement order when the input conforms to the first operation. One of the message areas of the current functional interface is selected when the input conforms to the second operation. Thus, fast and intuitive operation is performed on the plurality of functional interfaces through the present invention.

In order to make the aforementioned characteristics and advantages of the present invention comprehensible, embodiments accompanied with figures are described in detail below.

BRIEF DESCRIPTION OF THE DRAWINGS

FIG. 3A is a schematic view of an arrangement order of a plurality of functional interfaces according to an embodiment of the present invention.

FIG. 3B to 3D are respective schematic views of operations on functional interfaces according to an embodiment of the present invention.

DETAILED DESCRIPTION

Figure 1:
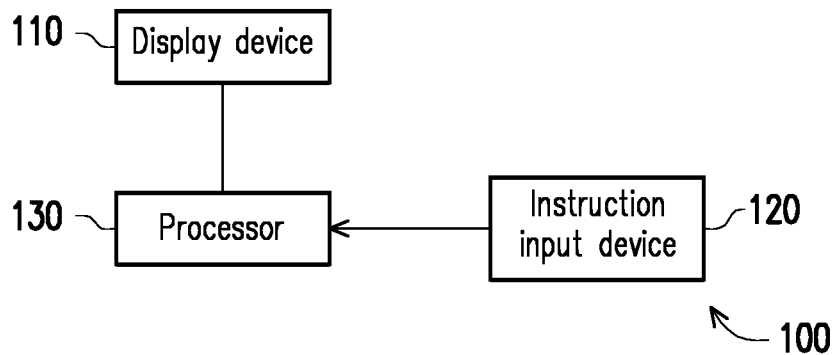
FIG. 1 is a schematic view of a computer system according to an embodiment of the present invention.

Referring to FIG. 1, FIG. 1 is a system schematic view of a computer system according to an embodiment of the present invention. A computer system 100 of FIG. 1 is used for providing a plurality of functional interfaces. The plurality of functional interfaces has an arrangement order. Each functional interface comprises at least one message area. In the present embodiment, the plurality of functional interfaces may be defaulted in the computer system 100, but the present invention is not limited herein. In other embodiments, the functional interface may be newly added by a user through the operation of the computer system 100. The computer system 100 comprises a display device 110, an input device 120 and a processor 130. The display device 110 is used for displaying a current functional interface of the plurality of functional interfaces. That is, the display device 110 is used for displaying one of the functional interfaces. For example, the display device 110 may be a display device capable of displaying the functional interfaces, such as a liquid crystal display (LCD), a light-emitting diode (LED), a field emission display (FED), an organic light-emitting diode (OLED), an active-matrix organic light-emitting diode (AMOLED), a flexible display and a transparent light emitted diode display.

For example, the input device 120 may be a keyboard, a mouse or a touchpad, a trackball or any other input tool. When the input device 120 is the keyboard, input is generated by pressing keys of the input device 120. When the input device 120 is the touchpad or trackball, the input is generated by touching or dragging the input device 120. When the input device 120 is the mouse, the input is generated by pressing a left key/a right key of the input device 120.

The processor 130 is coupled between the display device 110 and the input device 120. The processor 130 is used for receiving the input through the input device 120 and determining whether the input conforms to a first operation or not. In the embodiment of the present invention, the first operation may be a press of a first specific key combination of the input device 120. For example, an action of pressing the specific key combination may be performed by pressing a singular key, pressing a plurality of keys at the same time or continuing pressing a second key within specific time after pressing the first key. The first operation may also be a first specific trace (for example, a dragging from left to right) generated by the input device. Likewise, the second operation is a press of a second specific key combination of the input device or a second specific trace generated by dragging the input device. When the input conforms to the first operation, the processor 130 switches the current functional interface to another functional interface of the plurality of functional interfaces according to the arrangement order, or when the input conforms to the second operation, the processor 130 selects one of the message areas of the current functional interface. For example, the processor 130 may be a central processing unit (CPU), or a microprocessor, a digital signal processor, a programmable controller, application-specific integrated circuits (ASIC), a programmable logic device (PLD) or any other similar device capable of being programmable for a common purpose or a special purpose, or a combination of the devices, or may be load or executed in a computer program.

Figure 2:
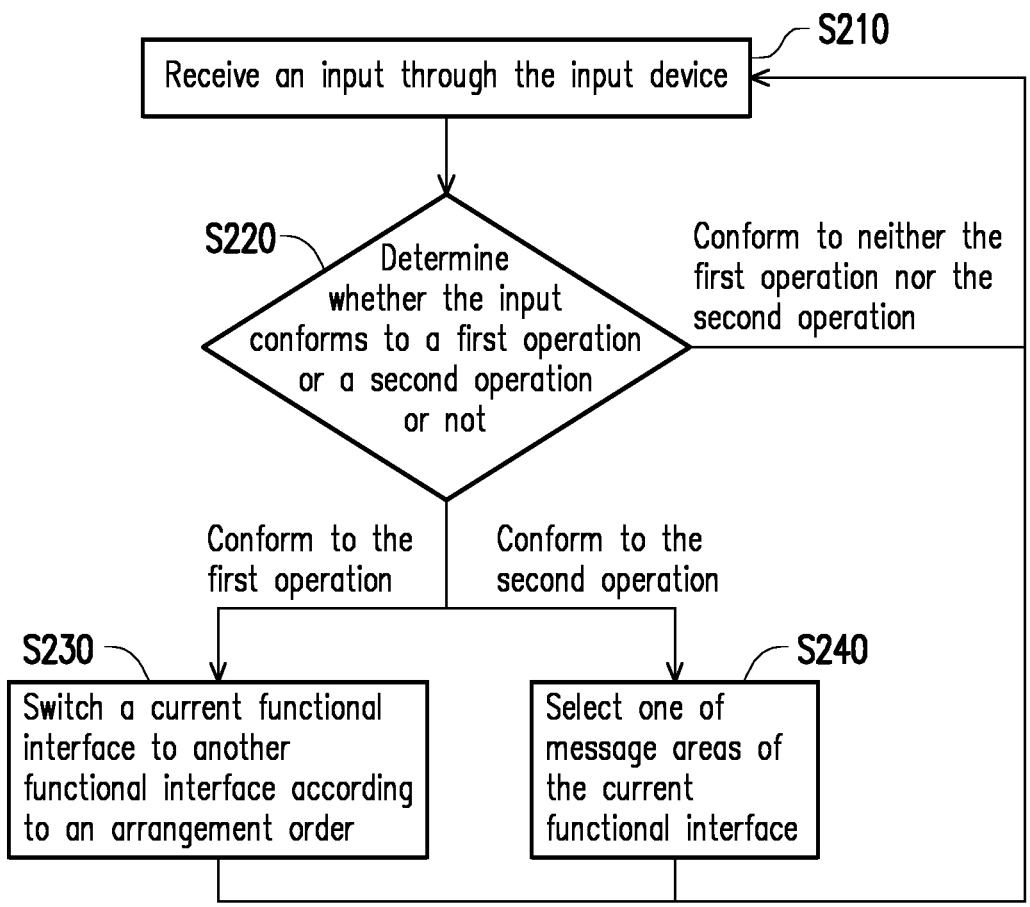
FIG. 2 is a flow chart of an interface operation method according to an embodiment of the present invention.

Referring to FIG. 1 and FIG. 2 at the same time, FIG. 2 is a flow chart of an interface operation method according to an embodiment of the present invention. In the present embodiment, the processor 130 receives an input through the input device 120 in a step S210, and determines that whether the input conforms to a predetermined first operation or second operation or not in a step S220. If the input conforms to the first operation (for example, pressing a right key of the input device 120), then enter a step S230. In the step S230, the current functional interface displayed on the display device 110 is switched to another functional interface according to the arrangement order of the plurality of functional interfaces, and the switched functional interface serves as a new current functional interface. In the step S220, if the processor 130 determines that the input conforms to the second operation, enter a step S240. In the step S240, one of the message areas displaying the current functional interface is selected according to the second operation. In the step S220, if the input does not conform to the first operation or the second operation, return to the step S210.

Further illustrated, referring to FIG. 1, FIG. 2 and FIG. 3A at the same time, FIG. 3A is a schematic view of an arrangement order of a plurality of functional interfaces according to an embodiment of the present invention. In the embodiments of FIG. 1 to FIG. 3A, the computer system 100 may provide functional interfaces 310 to 350. The functional interfaces 310 to 350 have an arrangement order, as shown in FIG. 3A. For example, the functional interfaces 310 to 330 are arranged in a direction D3, and the functional interfaces 320, 340 and 350 are arranged in a direction D1. Message areas 310a to 310d are included in the functional interface 310. Message areas 320a to 320c are included in the functional interface 320. Message areas 330a and 330b are included in the functional interface 330. Message areas 340a to 340c are included in the functional interface 340. A message area 350a is included in the functional interface 350. The message areas 310a to 350a are function setting areas or message notification areas of the functional interfaces 310 to 330. The message areas 310a to 350a do not overlap with each other. In the present embodiment, at least two message areas of the message areas 310a to 350a may be identical, which means that the functional interfaces 310 to 350 may provide the same function setting areas or message notification area. The present invention is not limited by the number of the functional interfaces and the message areas of the embodiment. What one needs to pay attention to is that, FIG. 3A is only the schematic view of the arrangement order of the functional interfaces 310 to 350. The functional interfaces 310 to 350 are not displayed on the display 110 at the same time, but are sequentially displayed on the display 110 according to the input of a user.

Figure 3B:
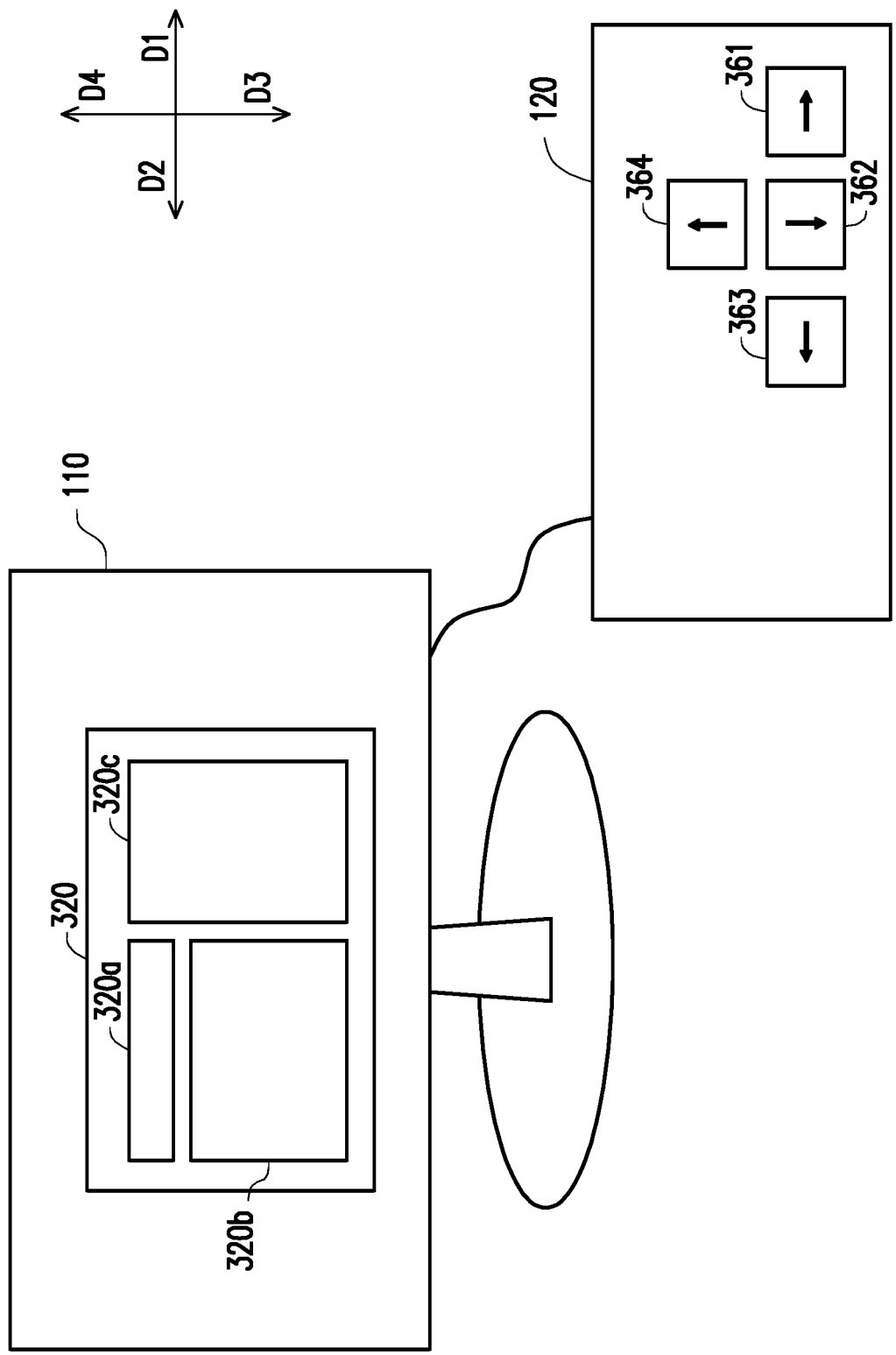
Figure 3D:
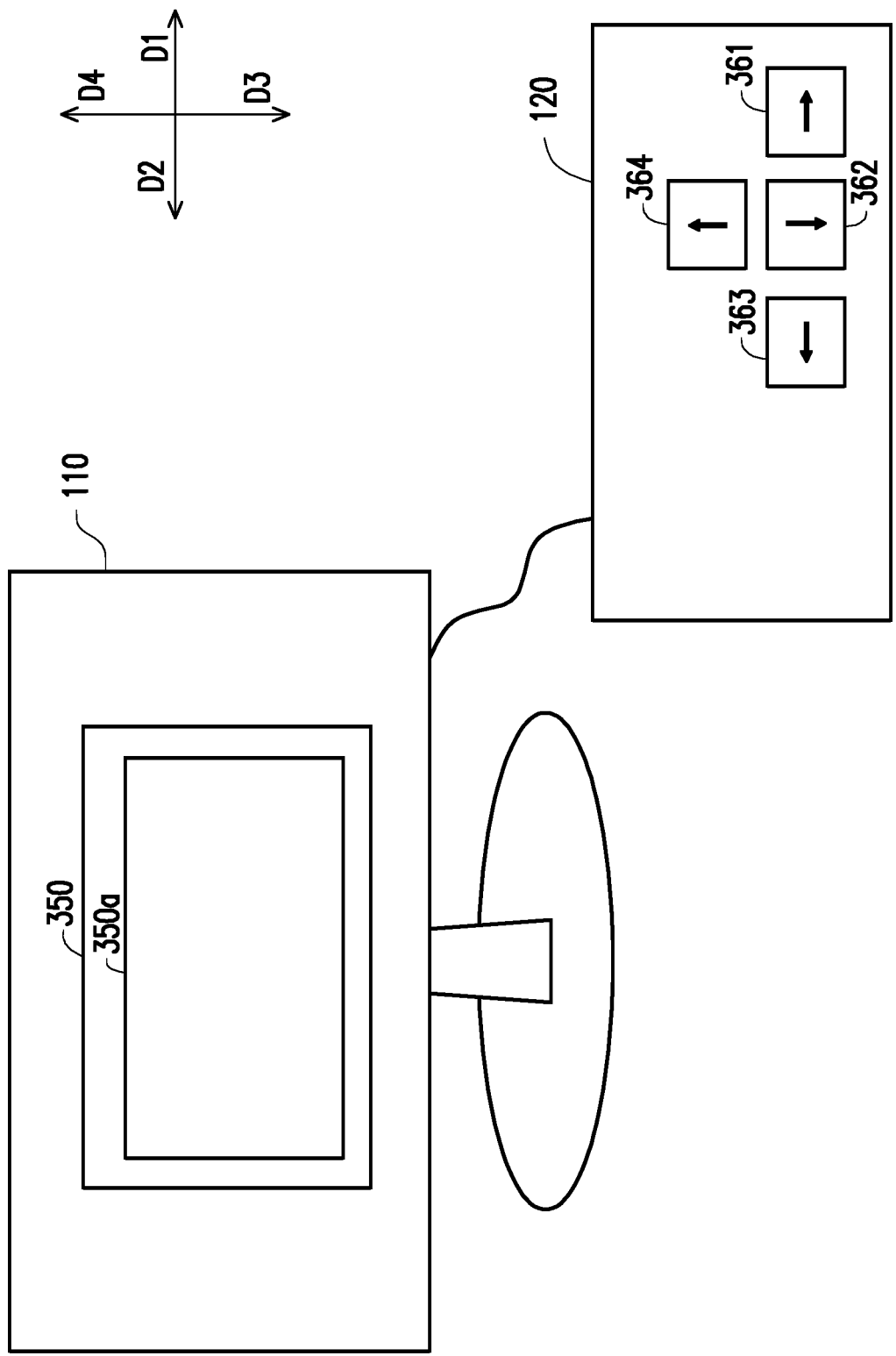

Referring to FIG. 3B to 3D, FIG. 3B to 3D are respective schematic views of operations on functional interfaces according to an embodiment of the present invention. In the present embodiment, the input device 120 may comprises keys 361 to 364. Input is single key input generated by pressing one of the keys 361 to 364. The keys 361 to 364 may be any virtual keys or physical keys of an existing testing device, manufacturing device and monitoring device, and the present invention is not limited by the present embodiment.

In the present embodiment, for example, the first operation may be performed by pressing the key 361 to display the functional interfaces 320, 340 and 350 on the display device 110 according to the arrangement order in the direction D1, and by pressing the key 362 to display the functional interfaces 310 to 330 on the display device 110 according to the arrangement order in the direction D3. For example, the second operation may be performed by pressing the key 362 to select the message area in the current functional interface.

The processor 130 receives the input through the input device 120 in the step S210, and determines whether the input conforms to the first operation or the second operation in the step S220. When the input is generated by pressing the key 361, the processor 130 determines that the input conforms to the first operation and enters the step S230. The processor 130 displays the functional interfaces 320, 340 and 350 on the display device 110 in the step S230 according to the arrangement order in the direction D1. For example, when the user presses the key 361, the current functional interface 320 (as shown in FIG. 3B) originally displayed on the display device 110 is switched to the functional interface 340, and the functional interface 340 serves as a current functional interface (as shown in FIG. 3C). When the user presses the key 361 again, the current functional interface 340 displayed on the display device 110 is switched to the functional interface 350, and the functional interface 350 serves as a current functional interface (as shown in FIG. 3D). The user presses the key 361 to display the functional interfaces 320, 340 and 350 on the display device 110 according to the arrangement order in the direction D1. Similarly, the user presses the key 362 to display the functional interfaces 310, 320 and 330 on the display device 110 according to the arrangement order in the direction D3.

In other embodiments, for example, the user may display the functional interfaces 320, 340 and 350 on the display device 110 according to the arrangement order in the direction D1 by a first specific trace generated by dragging the touchpad or trackball. The user may also display the functional interfaces 310, 320 and 330 on the display device 110 according to the arrangement order in the direction D3 by means of another first specific trace.

In other embodiments, for example, the user may display the functional interfaces 320, 340 and 350 on the display device 110 according to the arrangement order in the direction D1 by pressing the left key or the right key of the mouse or by the first specific trace generated by dragging the mouse. The user may also display the functional interfaces 310, 320 and 330 on the display device 110 according to the arrangement order in the direction D3 by means of another first specific trace generated by dragging the mouse.

When the input is single key input generated by pressing the key 362, the processor 130 determines that the input conforms to the second operation and enters the step S240. The processor 130 selects the message area on the functional interface displayed on the display device 110 according to the second operation in the step 240. For example, when the user presses the key 362, the message areas 320a to 320c in the functional interface 320 may be selected. In other embodiments, for example, the user may select the message areas 320a to 320c by a second specific trace input generated by the touchpad or trackball.

In other embodiments, for example, the user may select the message areas 320a to 320c sequentially by a second single key input of left key or right key input or a second singular sliding trace input generated by the mouse. The user may select the message areas 310a to 350a of the functional interfaces 310 to 350 through the input respectively conforming to the first operation and the second operation. Thus, the user performs fast and intuitive operation on the plurality of functional interfaces.

In the present embodiment, when the input is a single key input generated by pressing another key, the processor 130 determines that the input does not conform to the first operation or the second operation in the step S220 to enter the step S210.

In the present embodiment, new operation may be set, for example, by pressing other keys (such as the key 364) to display the functional interfaces 320, 340 and 350 on the display device 110 according to the arrangement order in the direction D3, or display the functional interfaces 310 to 330 on the display device 110 according to an arrangement order in a direction D4. For example, the user may switch the current functional interface 350 displayed on the display device 110 back to the functional interface 340 by the new operation.

In some embodiments, the first operation may be performed by pressing the keys 361 and 362 at the same time to display the functional interfaces 320, 340 and 350 on the display device 110 according to the arrangement order in the direction D1, and pressing the keys 363 and 364 at the same time to display functional interfaces 310, 320 and 330 on the display device 110 according to the arrangement order in the direction D3. In some embodiments, for example, the second operation may be performed by pressing the keys 363 and 364 at the same time to select the message areas (the message areas 320a to 320c in the functional interface 320) of the current functional interface.

Figure 4:
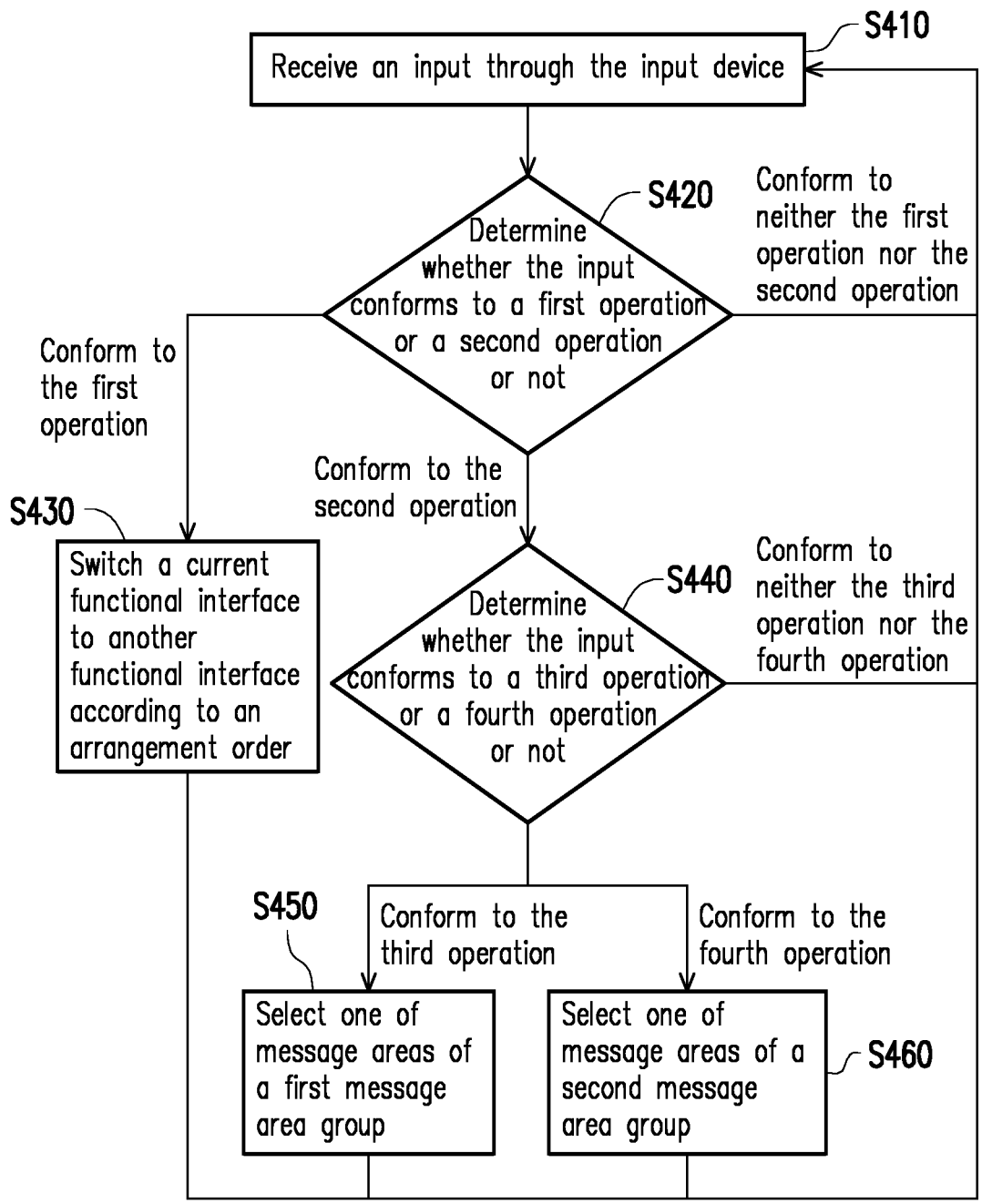
FIG. 4 is a flow chart of an interface operation method according to another embodiment of the present invention.
Figure 5A:
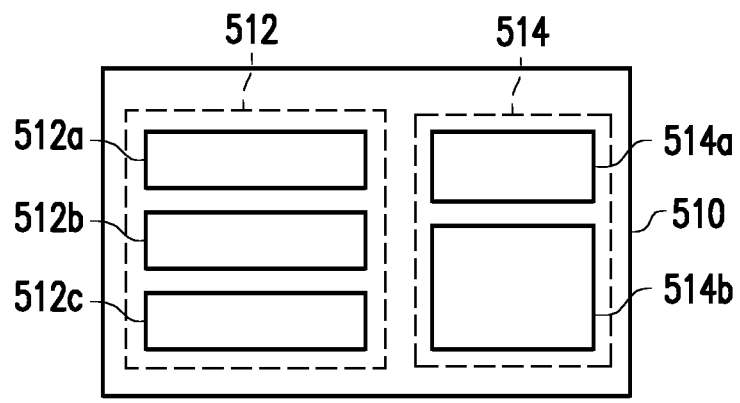
FIG. 5A to 5B are respective schematic views of a functional interface according to another embodiment of the present invention.
Figure 5B:
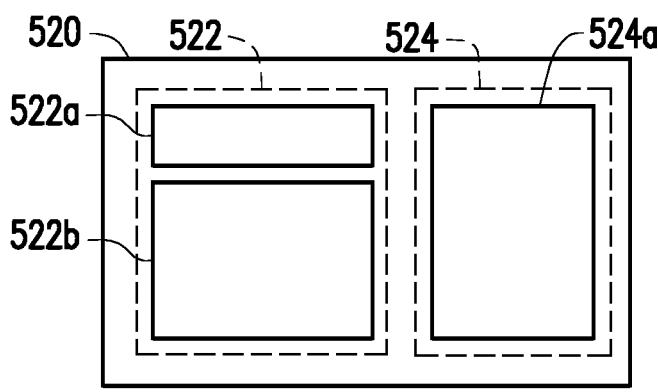

FIG. 4 is a flow chart of an interface operation method according to another embodiment of the present invention. FIG. 5A and FIG. 5B are respective schematic views of a functional interface according to another embodiment of the present invention. In embodiments of FIG. 1, FIG. 4, FIG. 5A and FIG. 5B, a plurality of message areas of functional interfaces 510 and 520 are divided into a first message area group and a second message area group. For example, the functional interface 510 comprises a first message area group 512 and a second message area group 514, the first message area group 512 comprises message areas 512a to 512c, and the second message area group 514 comprises message areas 514a and 514b. The functional interface 520 comprises a first message area group 522 and a second message area group 524, the first message area group 522 comprises message areas 522a to 522b, and the second message area group 524 comprises a message area 524a.

In the present embodiment, the second operation may further include a third operation and a fourth operation. For example, given that the functional interface 510 is a current functional interface, the third operation may be a press of a third specific key combination of the input device 120 or a third specific trace generated by dragging the input device 120, so that one of the message areas 512a, 512b and 512c of the first message area group 512 is selected. The fourth operation may be a press of a fourth specific key combination of the input device 120 or a fourth specific trace generated dragging the input device 120, so that one of the message areas 514a and 514b of the second message area group 514 is selected.

For example, the processor 130 receives the input through the input device 120 in a step S410, and determines whether the input conforms to a predetermined first operation or second operation in a step S420. When the input is generated by pressing the key 361, the processor 130 determines that the input conforms to the first operation and enters the step S430. The processor 130 displays the functional interfaces 310 to 350 on the display device 110 according to one of arrangement orders in directions of D1 to D4 in a step S430. For example, given that the functional interface 540 is a current functional interface, when the input is generated by pressing the key 362 or 364, the processor determines that the input conforms to the second operation, and further determines whether the input is a third operation or a fourth operation (step S440). The processor 130 selects one of message areas 512a, 512b and 512c of the first message area group 512 according to the third operation in a step S450. The processor 130 selects one of message areas 514a and 514b of the second message area group 514 according to the fourth operation in a step S460. Thus, the message areas are divided into a plurality of message area groups, so that the user can select the message area faster.

In the present embodiment, when the input is single key input generated by pressing other keys, the processor 130 determines that the input does not conform to the first operation, the second operation, the third operation or the fourth operation in the steps S420 and S440 and enters the step S410.

Figure 6:
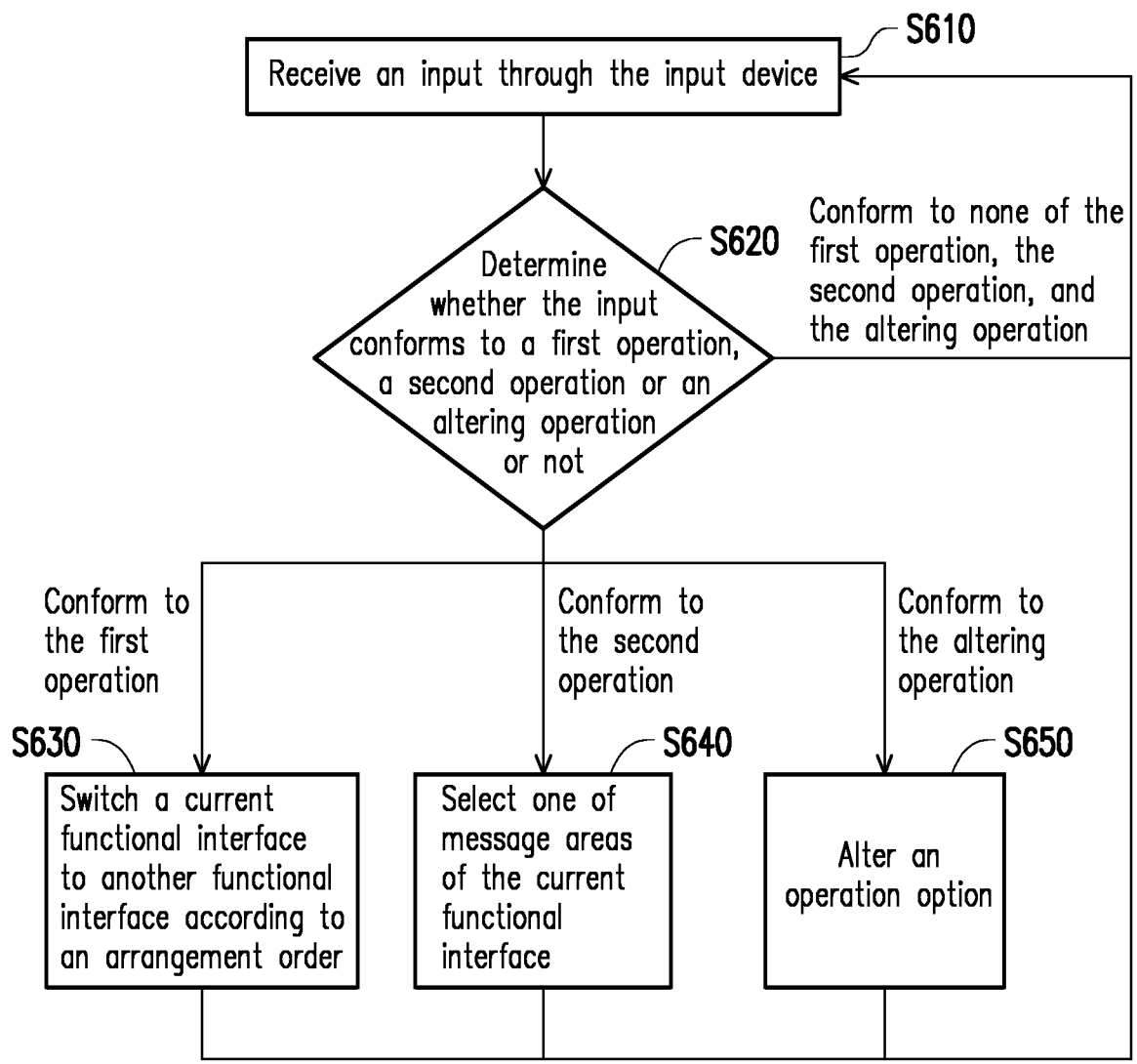
FIG. 6 is a flow chart of an interface operation method according to still another embodiment of the present invention.

Referring to FIG. 1 and FIG. 6, FIG. 6 is a flow chart of an interface operation method according to still another embodiment of the present invention. A difference of FIG. 6 and FIG. 2 lies in that the interface operation method of FIG. 6 further includes that the processor 130 determines whether the input conforms to an altering operation or not in a step S620. The altering operation of the present embodiment is a press of a specific altering key combination of the input device 120 or a specific altering trace generated by dragging the input device, thus an operation option of the message area is altered.

The processor 130 receives the input through the input device 120 in a step S610, and determines whether the input conforms to the first operation, the second operation or the altering operation in the step S620. When the processor 130 determines that the input conforms to the altering operation in a step S650, the processor 130 alters the operation option of the message area according to the altering operation.

Figure 7:
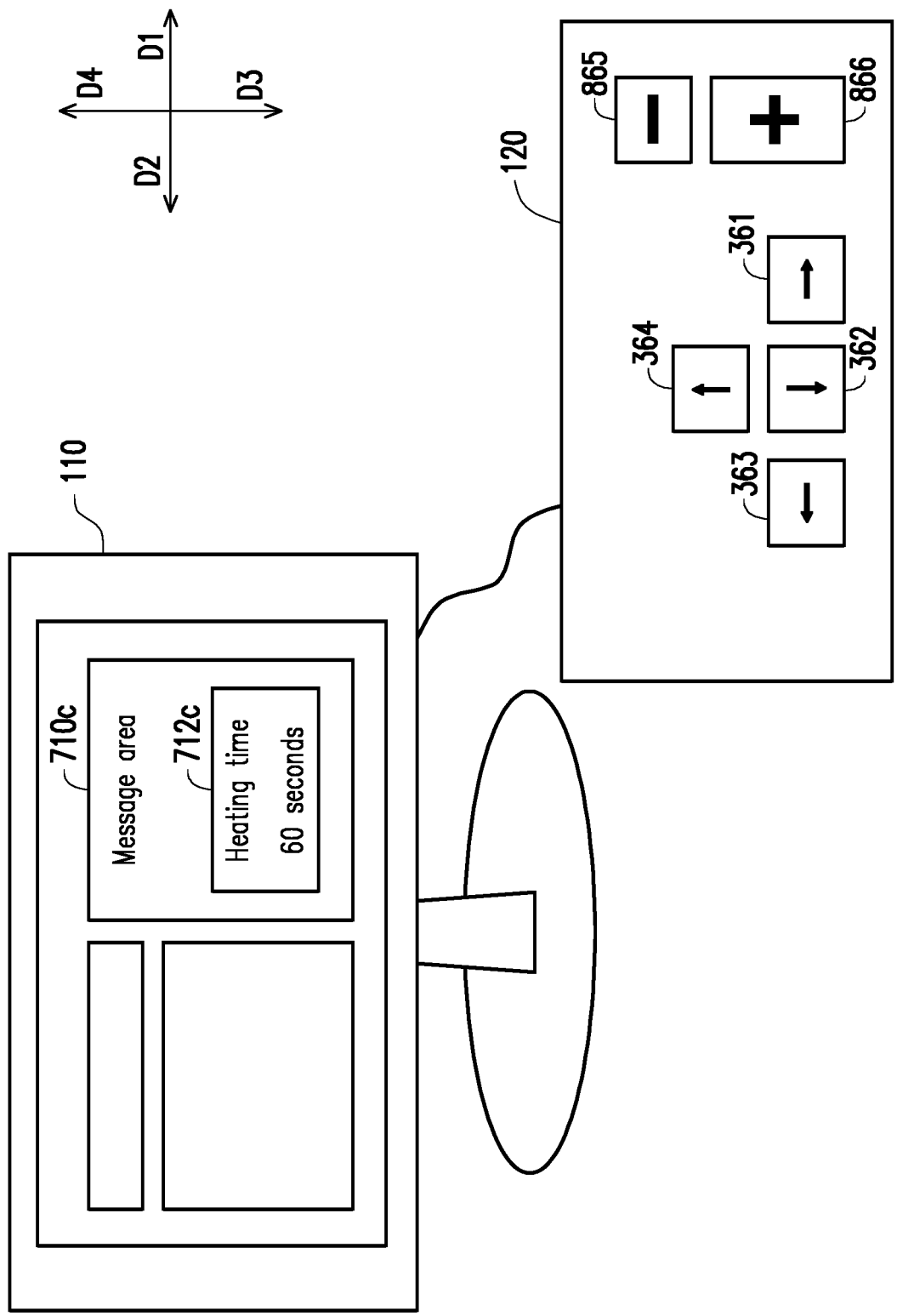
FIG. 7 is a schematic view of operations on functional interfaces according to still another embodiment of the present invention.

Taking an example for illustration herein, referring to FIG. 1, FIG. 6 and FIG. 7 at the same time, FIG. 7 is a schematic view of operations on functional interfaces according to still another embodiment of the present invention. In the present embodiment, a message area 710c of FIG. 7 includes an operation option 712c, and the input device 120 includes keys 361 to 364, 865 and 866. The message area 710c is selected after the first operation and the second operation are performed. There is a plurality of defaulted setup parameters in function settings corresponding to the message area 710c. The operation option 712c is used for displaying the selected setup parameters i from those setup parameters. The selected setup parameters are the set parameters to be executed or reserved. In the present embodiment, for example, the third operation may alter the operation option 712c backwards step by step by pressing the singular key 866. The processor 130 may perform selection on the message area 710c according to the first operation and the second operation at least in the steps S610 to S640. Next, when the input is single key input generated by pressing the key 866, the processor 130 may determines that the input conforms to the third operation in the step S410, then the processor 130 alters the operation option 712c of the message area 710c in the step S450 according to the third operation, and thus the selected setup parameters are changed. For another example, the message area 710c is a setting area for "heating time" in a manufacturing device, and the setup parameter displayed by the operation option 710c is "heating time". The selected setup parameter currently displayed by the operation option 712c is "60 seconds". When the user presses the key 866, the originally selected setup parameter of "60 seconds" is altered into "61 seconds". When the user presses the key 866, the selected setup parameter "61 seconds" is altered into "62 seconds". In other embodiments, for example, the user may alter the operation option 712c of the selected message area 710c through the third operation, such as a single touch trace generated by the touchpad or trackball. In other embodiments, for example, the user may alter the operation option 712c of the message area 710c through the third operation, such as a single key input or a dragging trace generated by the mouse.

The user may select the plurality of message areas of the plurality of functional interfaces through the input conforming to the first operation and the second operation, and may alter the operation option of the message area through the input conforming to the third operation. Thus, the user may perform fast and intuitive operation on the plurality of functional interfaces.

In the present embodiment, a new altering operation may be set up. Referring to FIG. 1, FIG. 6 and FIG. 7 at the same time, for example, the new operation may be performed by pressing the singular key 865 to reverse with the third operation, so that the user may press the key 865, and the selected setup parameter "61 seconds" displayed in the operation option 712c is reversely altered back to "60 seconds". The user presses the key 865 again, and the selected setup parameter of "60 seconds" displayed in the operation option 712c is reversely altered back to "59 seconds". In other embodiments, other operation may be set up. The user may press the key 365 to make the selected setup parameter of "60 seconds" in the operation option 712c be altered into "70 seconds". The user presses the key 365 again, and the selected setup parameter of "70 seconds" displayed in the operation option 712c is altered into "80 seconds".

Based on the above, according to the present invention, by determining whether the input conforms to the first operation or the second operation, the functional interfaces are sequentially switched according to the arrangement order when the input conforms to the first operation, and the plurality of message areas of the current functional interface displayed on the display device is sequentially selected according to the second operation when the input conforms to the second operation. Thus, the user may perform fast and intuitive operation on the plurality of functional interfaces through the present invention. In addition, the present invention divides the plurality of message areas into the plurality of message area groups, and thus the user may select the message area faster.

Although the present invention is disclosed with the embodiments as above, it is not used for limiting the present invention, any one of ordinary skill in the art may make little alteration and modification without deviating from the spirit and scope of the present invention, and thus the protection scope of the present invention should take the attached claims as the criterion.

What is claimed is:

1. An interface operation methodused for a computer system, wherein the computer system comprises an input device and a display device, the computer system provides a plurality of functional interfaces and the display device is used for displaying one current functional interface of the functional interfaces, the functional interfaces comprise an arrangement order and each functional interface comprises a plurality of message areas, and the interface operation method comprises:
   receiving an input through the input device;
   determining whether the input conforms to a first operation; and
   switching the current functional interface to another functional interface of the functional interfaces according to the arrangement order when the input conforms to the first operation.

2. The interface operation method according to claim 1, wherein the input is generated by at least one of pressing the input device and dragging the input device.

3. The interface operation method according to claim 2, wherein the first operation is at least one of a press of a first specific key combination of the input device and a first specific tracegenerated by dragging the input device, and the first specific key combination comprises at least one key of the input device.

4. Theinterface operation method according to claim 2, further comprising:
   determining whether the input conforms to a second operation; and selecting one of the message areas of the current functional interface when the input conforms to the second operation, wherein the second operation is at least one of a press of a second specific key combination of the input device and a second specific trace generated by dragging the input device, and the second specific key combination comprises at least one key of the input device.

5. The interface operation method according to claim 4, wherein the message areas of the current functional interface are divided into a first message area group and a second message area group, and the step of selecting one of the message areas of the current functional interface when the input conforms to the second operation comprises:

selectingone of the message areasfrom the first message area group when the input conforms to a third operation; and selecting one of the message areas from the second message area group when the input conforms to a fourth operation, wherein the third operation is at least one of a press of a third specific key combination of the input device and a third specific trace generated by dragging the input device, and the fourth operation is at least one of a press of a fourth specific key combination of the input device and a fourth specific trace generated by dragging the input device.

6. Theinterface operation method according to claim 1, wherein at least one of the message areas of each functional interface comprises an operation option.

7. Theinterface operation method according to claim 6, further comprising:

receiving an altering operation; and altering the operation option according to the altering operation, wherein the altering operation is at least one of a press of a specific altering key combination of the input device and a specific altering trace generated by dragging the input device.

8. A computer system, used for providing a plurality of functional interfaces, the functional interfaces comprising an arrangement order and each functional interface comprising a plurality of message areas, and the computer system comprising:

a display device, used for displaying one current functional interface of the functional interfaces;

an input device, used for receiving an input; and a processor, used for:

determining whether the first input conforms to a first operation; and switching the current functional interface to another functional interface of the functional interfaces according to the arrangement order when the input conforms to the first operation.

9. The computer system according to claim 8, wherein the input is generated by at least one of pressing the input device and dragging the input device.

10. The computer system according to claim 9, wherein the first operation is at least one of a press of a first specific key combination of the input device and a first specific trace generated by dragging the input device, and the first specific key combination comprises at least one key of the input device.

11. The computer system according to claim 9, wherein the processor is further used for:

determining whether the first input conforms to a second operation; and selecting one of the operation areas of the current functional interface when the input conforms to the second operation, wherein the second operation is at least one of a press of a second specific key combination of the input device and a second specific trace generated by dragging the input device, and the second specific key combination comprises at least one key of the input device.

12. The computer system according to claim 11, wherein the message areas of the current functional interface are divided into a first message area group and a second message area group, and the processor is further used for:

selecting one of the message areas from the first message area group when the input conforms to a third operation; and selecting one of the message areas from the second message area group when the input conforms to a fourth operation, wherein the third operation is at least one of a press of a third specific key combination of the input device and a third specific trace generated by dragging the input device, and the fourth operation is at least one of a press of a fourth specific key combination of the input device and a fourth specific trace generated by dragging the input device.

13. The computer system according to claim 8, wherein at least one of the message areas of each functional interfaces comprises an operation option.

14. The computer system according to claim 13, wherein the processor is further used for:

receiving an altering operation; and altering the operation option according to the altering operation, wherein the altering operation is at least one of a press of a specific altering key combination of the input device and a specific altering trace generated by dragging the input device.

* * * * *